Patented June 24, 1941

2,246,526

UNITED STATES PATENT OFFICE 2,246,526

RESINOUS PRODUCT HAVING ANION EXCHANGE PROPERTIES AND PROCESS OF PRODUCING SAME

Easton Melof, Chicago, Ill., assignor to National Aluminate Corporation, Chicago, Ill., a corporation of Delaware No Drawing. Application January 20, 1938, Serial No. 185,930

7 Claims. (Cl. 260—72)

The present invention relates to a condensation product of improved anion removal capacity and to a process of producing the same.

Heretofore exchange materials have been produced from m-phenylenediamine according to the method of Adams & Holmes, Chemistry & Industry, 54, 4T (1935), by condensing the free diamine dissolved in an excess of hydrochloric acid, with a large excess of formaldehyde.

The principal object of the present invention is a new and improved process of condensing aryl polyamines with aldehydes, whereby a condensation product of increased anion removal capacity is obtained.

A further object is a method of producing a condensation product of improved properties from aryl polyamines and aldehydes by protecting one or some of the several amino groups of the polyamine from reaction with the aldehyde.

A further object is an improved anion removal material produced by such a process.

Other objects will appear as the invention is hereinafter more fully described.

I have found that the foregoing objects may be achieved by condensing an aldehyde in the presence of a suitable condensing agent with an aryl polyamine derivative which has at least one free amino group and at least one amino group protected from reaction with the aldehyde. After the condensation has been brought about, the amino-protecting group is then split off from the condensation product.

The protection of the amino group or groups may be accomplished in a number of ways well known in the art. I prefer, however, to convert one or some of the amino groups into the acyl derivatives by interaction with an equivalent amount of acid halide or acid anhydride.

The resulting derivative, containing at least one free amino group and at least one protected amino group, is then condensed with an aldehyde such as aliphatic aldehyde, for example formaldehyde, in the presence of a condensing agent. When the condensation reaction is complete, the amino protecting groups are split off by suitable means such as hydrolysis, alcoholysis, ammonolysis, or the like, to produce a condensation product having at least one free aryl amino group in the molecule. The product obtained in the foregoing manner is characterized by markedly improved capacity for anion removal, and is definitely superior in this respect to resins obtained according to the methods of the prior art.

In order to disclose the nature of my invention more clearly, the following preferred embodiment thereof will now be described. It is to be understood, however, that this is done solely by way of illustration and is not to be construed as a limitation upon the spirit or scope of my invention.

In carrying out my invention, I prefer to start with m-phenylenediamine, since this material is one of the most readily available members of the class of aromatic polyamines. However, other members of the class, such as the various benzene triamines, the naphthalene polyamines and the like may be employed if desired, and I do not wish to limit myself to a particular member of the class.

The aryl polyamines in which the amino groups are meta to each other, are more satisfactory and I prefer to use amines of this type.

The m-phenylenediamine, or other aromatic polyamine, is first converted into the aminoacylamino derivative, for example, the monoacetyl derivative. This may be accomplished in the usual manner by treating the polyamine with less than the equivalent amount of acetyl chloride or acetic anhydride. The resulting amino acetamino derivative, which may be designated m-amino acetanilide, is condensed with formaldehyde in the following manner: 7½ parts by weight of m-amino acetanilide hydrochloride is dissolved in 100 parts by weight of water. 28 parts by weight of 40% commercial formaldehyde is added. The reaction mixture is evaporated to dryness, and a dark red solid is obtained. The residue is crushed and screened and then boiled with 25% aqueous sodium hydroxide solution, and later with 25% alcoholic sodium hydroxide solution to insure complete removal of the N-acetyl group.

On washing and drying, the hydrolyzed condensation product has an anion removal capacity which is approximately three times that of the unhydrolyzed intermediate product and over twice that of the m-phenylenediamine product prepared according to the methods of the prior art.

The product obtained by the foregoing process may be employed to remove acidic compounds generally from solutions thereof. Thus, for example, aqueous solutions of mineral acids such as sulfuric acid, hydrochloric acid or phosphoric acid; or aqueous solutions of organic acids such as the aliphatic acids, for example, acetic acid; or aqueous solutions of acidic salts such as sodium acid sulfate, may be rendered substantially neutral by passing said solutions over or through the product produced in accordance with my invention. In the case of the acid salts, such as sodium bisulfate, the effluent water contains no bisulfate ion, the material being converted into the neutral salt. Thus, when an aqueous solution of NaHSO$_4$ containing 50 grains per gallon, was passed through my improved anion-removal material, the total solids content was reduced 41% and the effluent water was neutral, the solids being present as Na$_2$SO$_4$.

When the improved condensation product in accordance with my invention is exhausted, it may be regenerated and rendered capable of further anion removal by treatment with an alkaline solution, for example, a dilute ammonium hydroxide solution or a dilute alkali metal hydroxide, such as a 3% solution of sodium hydroxide.

In the foregoing detailed description of my invention it is apparent that many variations in detail may be made without departing from the spirit and scope thereof. Thus many reagents may be employed to protect one or some of the amino groups of the aryl polyamine, such as the monoacyl derivatives obtained from reaction with the acid chloride or acid anhydride of propionic acid, butyric acid, isobutyric acid, pentanoic acid, and the higher members of the series. Furthermore, monoaryl polyamines other than those hereinbefore particularly mentioned may be used as starting materials. Thus naphthalene polyamines may be employed if desired. It is also apparent that other aldehydes such as acetaldehyde and the like may be used in place of formaldehyde. Likewise, other condensing agents for bringing about the condensation between the aldehyde and the protected polyamine may be used. In general any compound which is either acid or basic may be used for this purpose. Thus, alkalis such as sodium hydroxide are known to bring about the reaction. Likewise, mineral acids such as sulfuric acid, hydrobromic acid, phosphoric acid and the like; acid salts, such as sodium acid sulfate, etc.; and organic acids such as acetic acid, etc., are effective. Other equivalents will be readily apparent to anyone skilled in the art.

Many other variations in detail will be apparent to those skilled in the art. I therefore intend to be limited only in accordance with the following patent claims.

I claim:

1. The process of producing a resinous condensation product having anion exchange properties, which comprises condensing a mono-N-acylated aryl polymine with a sufficient amount of an aldehyde selected from the group consisting of formaldehyde and acetaldehyde, to form an aryl-amine-aldehyde resinous condensation product, and thereafter de-acylating the N-acylamino group of the said resinous condensation product, whereby to convert said group to an amino group.

2. The process of producing a resinous condensation product having anion exchange properties, which comprises condensing mono-N-acylated aryl diamine with a sufficient amount of formaldehyde to form an aryl amine-formaldehyde resinous condensation product, and thereafter deacylating the N-acylamino group of the said resinous product by hydrolysis, whereby to convert said group into an amino group.

3. The process of producing a resinous condensation product having anion exchange properties, which comprises condensing mono-N-acylated phenylenediamine with a sufficient amount of formaldehyde to produce an aryl-amine-aldehyde resinous condensation product, and thereafter de-acylating the said resinous product whereby to produce a resinous product having at least one free amino group, and characterized by anion exchange properties.

4. The process of producing a resinous condensation product having anion exchange properties, which comprises condensing mono-N-acylated m-phenylenediamine in the presence of a hydrohalide, with a sufficient amount of formaldehyde to form an aryl amine-aldehyde resinous condensation product, and thereafter treating said resinous product with an alkaline-reacting aqueous solution to convert the N-acylated amino group therein to a free amino group.

5. The process of producing a resinous condensation product having anion exchange properties, which comprises condensing mono-N-acylated m-phenylenediamine hydrohalide with a sufficient amount of formaldehyde to form an aryl amine-aldehyde resinous condensation product, and treating the said resinous product with an aqueous alkaline-reacting solution to produce a product having at least one free amino group.

6. A resinous condensation product of unknown structure and characterized by anion exchange properties, comprising the reaction product obtained by the process of claim 1.

7. A resinous condensation product of unknown structure and characterized by anion exchange properties, comprising the reaction product obtained by the process of claim 5.

EASTON MELOF.